Figure 1:
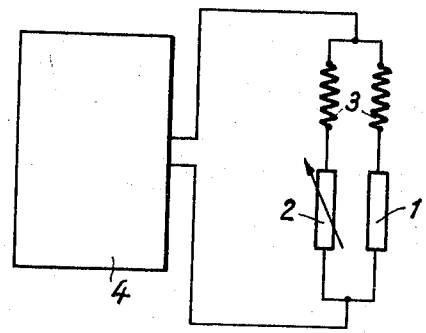

Jan. 31, 1956     S. L. OVERBY     2,733,406
MEASURING DEVICE

Filed Sept. 19, 1952     3 Sheets-Sheet 1

INVENTOR
SUNE LAMBERT OVERBY
By Frederick E. Hane
ATTORNEY

Jan. 31, 1956

S. L. OVERBY 2,733,406

MEASURING DEVICE

Filed Sept. 19, 1952

3 Sheets-Sheet 2

INVENTOR
SUNE LAMBERT ÖVERBY

BY Fredrick E. Hay

ATTORNEY

Jan. 31, 1956 S. L. OVERBY 2,733,406
MEASURING DEVICE

Filed Sept. 19, 1952 3 Sheets-Sheet 3

INVENTOR
SUNE LAMBERT ÖVERBY
BY Frederick E. Hane
ATTORNEY

United States Patent Office 2,733,406
Patented Jan. 31, 1956

2,733,406
MEASURING DEVICE

Sune Lambert Overby, Stockholm, Sweden, assignor to Telefonaktiebolaget LM Ericsson, Stockholm, Sweden, a company of Sweden Application September 19, 1952, Serial No. 310,380

Claims priority, application Sweden October 26, 1951

15 Claims. (Cl. 324—59)

The present invention refers to a device for balancing or measuring the magnitude of an impedance. It is known to measure the magnitude of an impedance by means of electrical measuring bridges. When using such bridges, it is often desirable to be able to cover a large range of the impedance. With the known four-armed measuring bridges of for example Maxwell or Hay-type, this entails difficulties, the screening having to be done with great care, on one hand in order to prevent mutual connecting impedances from arising between the arms of the bridge, and on the other hand in order to reduce the phase angles of the bridge arms and prevent connecting impedances from indirectly affecting the measuring bridge by means of their generator- or indicator-sides, respectively. To this comes also the difficulties to connect the measuring bridge to earth without detrimental effect on the result of the measurement. This is especially true as concerns the measurement of for example an inductive reactance, the numerical value of which is considerably smaller than the magnitude of the occurring capacitive reactance. When effecting measurements on such objects, it is known to connect a transformer between the object and a measuring bridge, and thus transform the corresponding inductance into a value, which it is easier to measure. A disadvantage of this method, as it has been effected until now, is however, that the internal data of the transformer influence the measurement and thus possibly upset considerably the result of said measurement.

According to the present invention the disadvantages hinted at in the preceding are eliminated by means of a device, which may be said to be characterized by a two-pole network consisting of two impedance-reciprocal branches connected in parallel, one of said branches comprising a resistance and the impedance, the magnitude of which is to be measured, and the other branch comprising a resistance having the same magnitude as the first mentioned resistance and an adjustable impedance with a phase angle, the sign of which is the opposite of the sign of the phase angle of the first mentioned impedance, the device being further characterized by a measuring circuit connected to the poles of said two-pole network, said measuring circuit being arranged with great accuracy to be sensitive to the divergence of the absolute value of the two-pole network impedance from the magnitudes of each one of the equally great resistances.

Figure 2:
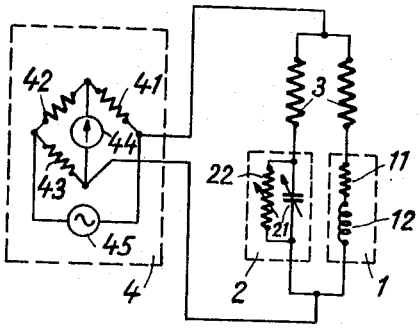
Figure 3:
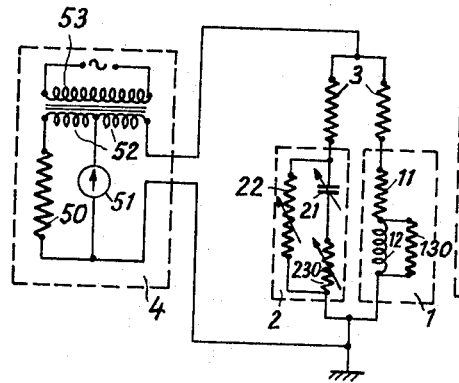
Figure 4:
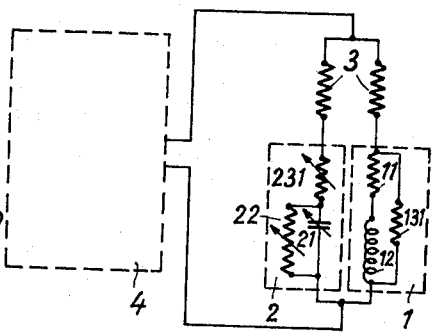
Figure 5:
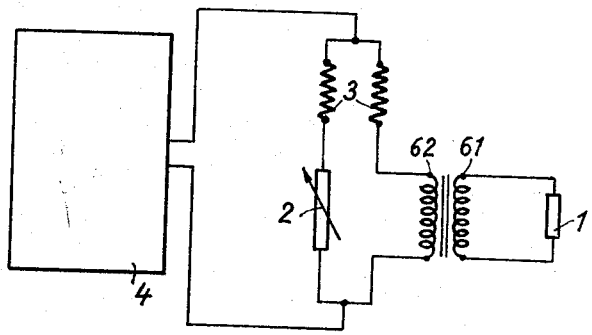
Figure 6:
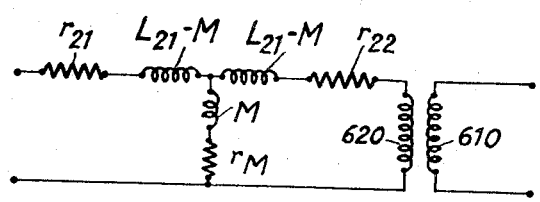
Figure 7:
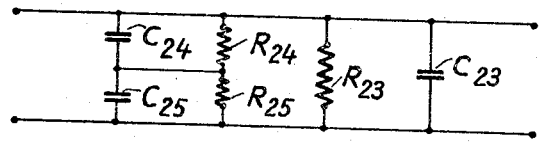
Figure 8:
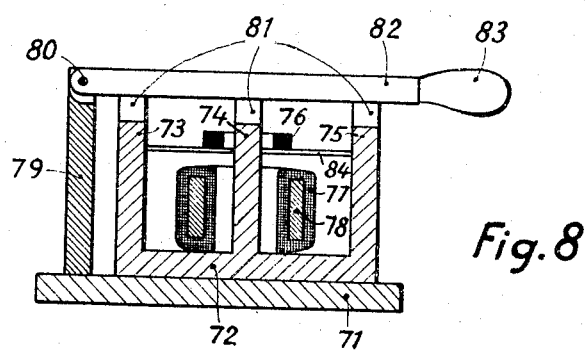
Figure 9:
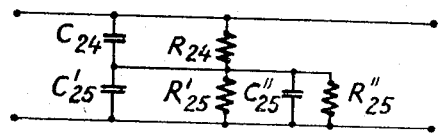
Figure 10:
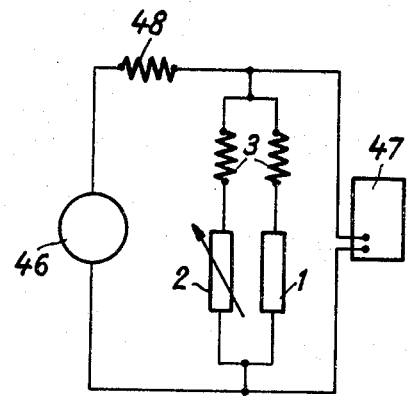
Figure 11:
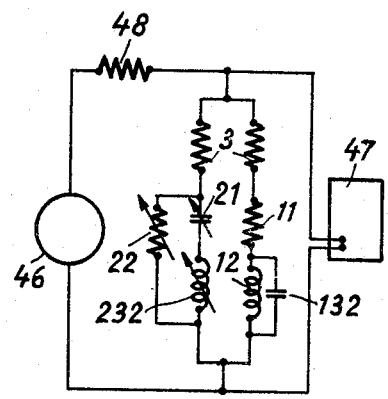
Figure 12:
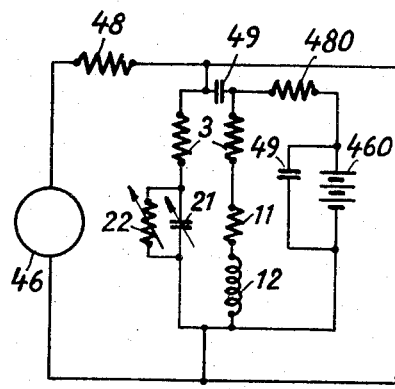
Figure 13:
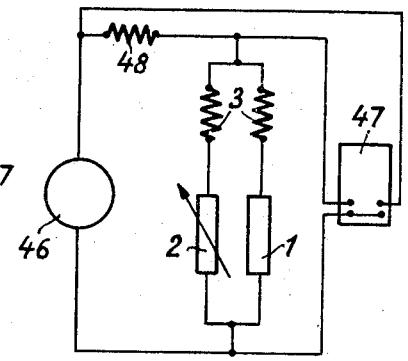

The invention will be described more closely in connection with the accompanying drawings, in which Fig. 1 schematically shows a device comprising a measuring circuit and an impedance-reciprocal two-pole network, Figs. 2, 3 and 4 show more in detail how the device according to Fig. 1 may be built, Fig. 5 shows a modification of the device according to Fig. 1 with a transformer connected between the object to be measured and the rest of the two-pole network, Fig. 6 shows one of the equivalent diagrams which may be drawn for a transformer, Fig. 7 shows a network of resistances and condensers which, in an impedance-reciprocal two-pole network, corresponds to a transformer with the equivalent diagram according to Fig. 6, Fig. 8 shows a practical embodiment of a detail of a device for measuring the inductance of a ring-shaped iron core, and Fig. 9 shows a modification of the network in Fig. 7. Figs. 10 and 11 show measuring devices comprising an oscillograph with one pair of plates, Fig. 12 shows a measuring device with one of the branches of the two-pole network being fed with direct current, and Fig. 13 shows a measuring device with a cathode oscillograph having two pairs of plates.

The device according to Fig. 1 comprises an impedance-reciprocal two-pole network 1—2—3 and a measuring circuit 4. The impedance-reciprocal two-pole network consists of two branches connected in parallel, one of said branches comprising a resistance 3 and the impedance 1, the magnitude of which is to be measured, and the other branch comprising a resistance 3 with the same magnitude as the first mentioned resistance, and an adjustable impedance 2 having a phase angle, the sign of which is the opposite of the sign of the phase angle of the impedance 1. Thus, if it is desired to measure the inductance of a coil, the adjustable impedance must comprise a condenser, and vice versa. The points of connection between the two branches are in the following called poles of the two-pole network.

If the adjustable impedance is set so, that the relation $$Z_1.Z_2=R^2 \quad (1)$$

is obtained, in which relation $Z_1$ indicates the value of the meaured impedance 1, $Z_2$ indicates the value of the adjustable impedance 2, and R is the magnitude of the equally great resistances 3, the two-pole network will act as a pure resistance having a value R, counted from the poles. The resistances 3 must with great accuracy be equal as regards their magnitudes.

The measuring circuit 4 is connected to the poles of the impedance-reciprocal two-pole network and is arranged in some known manner to be with great accuracy sensitive to the divergence of the absolute magnitude from the value R of the impedance of the two-pole network.

In Fig. 2, 11 and 12 are the resistive and respectively the reactive parts of a coil, said parts being supposed to lie in series in one of the branches of the two-pole network 1—2—3. The adjustable impedance comprises a condenser 21 connected in parallel with a resistance 22. As well the condenser 21 as the resistance 22 may within large limits be varied independent of each other. The measuring circuit 4 comprises a bridge connection, three arms of which comprise the resistances 41, 42, 43, and the fourth arm of which consists of the two-pole network 1—2—3. The resistances 42 and 41, the resistance 43 and the two-pole network 1—2—3 are by series of twos connected to the poles of a source of voltage 45. An indicating means 44 is connected between the point of connection of the resistances 41 and 42 and the point of connection of the resistance 43 and one of the poles of the two-pole network 1—2—3. The other pole of the two-pole network is connected to the same pole on the source of voltage 45 as the resistance 41. The device accordign to Fig. 2 is especially suitable for measuring a coil, the resistive part of which is greater than a tenth to a hundredth of the reactive part. Should the resistive part be smaller, it is suitable to connect the resistance 11 in parallel with the inductance 12, and thus have the adjustable impedance comprise a condenser and a resistance connected in series with said condenser. The choice between the two alternative possibilities of balance is influenced by the fact, that it is wished completely to avoid the combinations entailing extreme values for the adjustable resistance of the impedance 2. If the value of the inductance of the coil 11—12, the resistance 11, the capacity of the condenser 21 and the resistance 22 are designated by $L_{12}$, $R_{11}$, $C_{21}$ and $R_{22}$ respectively, the following relations are obtained as condition of balance for the two indicated cases:

$$L_{12} = C_{21}.R^2; \quad R_{11} = \frac{R^2}{R_{22}} \qquad (2)$$

where, as in the preceding R is the value of the equally great resistances 3.

If the impedance 1 according to Fig. 2, is conceived as a standard with adjustable inductance and resistance, the device may be used for measuring the capacity and loss-resistance of a condenser, the following relations being obtained when the same designations as in the preceding are used:

$$C_{21} = \frac{L_{12}}{R^2}; \quad R_{22} = \frac{R^2}{R_{11}} \qquad (3)$$

When measuring the impedance of for example a coil with iron-core, it may be suitable to represent the impedance 1 as shown in Fig. 3. The impedance 1 comprises a resistive part 11 and a reactive part 12 as in Fig. 2, but furthermore a resistance 130, connected in parallel with the part 12. The adjustable impedance 2 comprises the condenser 21 and a resistance 230 connected in series with said condenser and the resistance 22, parallel to the condenser 21 and the resistance 230. The measuring circuit 4 is a differential transformer 52—53, one of the differential windings 53 of which is connected to the poles of a source of alternating voltage, and the terminals of the other differential winding 52 of which are connected over a comparison-resistance 50 to the poles of the impedance-reciprocal two-pole network. An indicating means 51 is connected between the point of connection of the resistance 50 and one of the poles of the two-pole network and a terminal on the differential winding 52. The magnitude of the comparison-resistance 50 depends on the choice of the terminal of the differential winding 52. It may be said quite generally, that the comparison-resistance 50 must be as great as each one of the resistances 3, transformed by the conversion of the differential transformer. If the terminal is chosen as centralizer tapping, i. e. the differential winding is parted into two equally great parts, the resistance 50 is equal to the magnitude of each one of the equally great resistances 3. Such a measuring circuit has a number of technical advantages compared to the bridge connection according to Fig. 2. A differential transformer with the conversion 1:1 and a centralizer tapping on one of its windings can without difficulty be dimensioned so that the impedance balance relative to the centralizer tapping is very accurate over a large range as regards as well the impedance as the frequency. Besides, the resistance 50, the adjustable impedance 2 and the impedance 1 have one common point, suitably consisting of the earth potential of the measuring device.

When measuring with a device according to Fig. 3 double-valued adjustments are in certain cases obtained for the resistances 22 and 230. This occurs for example when measuring with a single sinusoidal alternating voltage. If however the measurements are effected on the same object to be measured with voltages having different frequencies, it has proved in several cases possible to obtain single-valued adjustments after a certain fitting of the balance of the resistances 22 and 230. If the values of the resistances 230 and 130 are designated by $R_{230}$ and $R_{130}$ respectively, and for the rest the same designations are being used as in the preceding, the following relations are obtained as balance condition:

$$L_{12} = C_{21}.R^2; \quad R_{11} = \frac{R^2}{R_{22}}; \quad R_{130} = \frac{R^2}{R_{230}} \qquad (4)$$

It may possibly be suitable to represent the impedance 1 as is shown in Fig. 4 with a resistive part 11 and a reactive part 12 as in Fig. 2, but furthermore with a resistance 131, connected in parallel with the series connection of the parts 11 and 12. The adjustable impedance 2 comprises the condenser 21 and the resistance 22, connected in parallel with said condenser, and a resistance 231, which lies in series with the said parallel connection. If the values of the resistances 231 and 131 are indicated by $R_{231}$, respectively $R_{131}$, and for the rest the same designations are being used as in the preceding, the following relations are obtained as balance condition:

$$L_{12} = C_{21}.R^2; \quad R_{11} = \frac{R^2}{R_{22}}; \quad R_{131} = \frac{R^2}{R_{231}} \qquad (5)$$

When measuring very low impedances a measuring device according to Fig. 5 is suitable. The impedance 1, the magnitude of which is to be measured, is connected to one of the windings 61 of a transformer 61—62, the other winding 62 of which forms, together with a resistance 3, one of the branches of the impedance reciprocal two-pole network. For the rest, the device corresponds to the device shown in Fig. 1. In Fig. 6 an equivalent diagram for the transformer 61—62 is shown, the natural capacity of which has been neglected. The equivalent diagram comprises an ideal transformer 610—620 having a conversion m equal to the inductance conversion of the transformer 61—62, which transformer is connected in cascade with a T-network of resistances and inductances. The horizontal arm of the T-network comprises in series a loss-resistance $r_{21}$, a leak inductance $L_{21}$–M, a leak inductance $L_{22}$–M and a loss resistance $r_{22}$, one of the terminals of which is connected to one of the terminals of the winding 620 of the transformer 610—620. The other terminal of said winding is over the vertical arm of the T-network, which consists of a series connection of a loss resistance $r_M$ and an inductance M, connected to the point of connection of the leak inductances $L_{21}$–M and $L_{22}$–M. The equivalent diagram is here shown for the case, when the winding 62 has more turns than the winding 61. In Fig. 6 the ideal transformer 610—620 has only and solely the function of transforming the impedance of a secondary load impedance $Z_b$ connected to the winding 61 into the value $m^2.Z_b$. The rest of the equivalent impedance network, i. e. the T-part, corresponds to the finite inductance and the imperfect degree of coupling of the transformer 61—62, both in relation to the winding 62. The T-part alone has between its input and output terminals the conversion 1:1. Said T-network of impedances comprises only positive resistances and inductances because in the expressions ($L_{21}$–M) and ($L_{22}$–M) the differences are always positive, due to $L_{21}$ and $L_{22}$ both relating to a conversion of 1:1. It must then be possible to construct a physically realizable reciprocal network to the T-part alone. The ideal transformer with its conversion will then be comprised only as a dimensionless number factor $m^2$ by which the load impedance $Z_b$ of the output terminals of the transformer must be multiplied. Thus the ideal transformer may be disregarded in the reciprocal network and be regarded only as a multiplying, constant number factor. There exists a D-shaped reciprocal network (T-D-conversion) of only resistances and capacitances pertaining to the T-network. Said reciprocal network is shown in Fig. 7 and consists of four partial networks of impedances connected in parallel, the first one consisting of a condenser $C_{23}$, the second one of a resistance $R_{23}$, the third one of a series connection of two resistances $R_{24}$ and $R_{25}$, and the fourth one of a series connection of two condensers $C_{24}$ and $C_{25}$. The elements of the series connections are connected by twos in parallel. If the designations in Figs. 6 and 7 at the same time represent the magnitude of the corresponding element, and the conversion of the ideal transformer is for convenience sake supposed to be 1:1, the following relations are obtained:

$$C_{23}=\frac{L_{21}-M}{R^2}; \quad R_{23}=\frac{R^2}{r_{21}}; \quad C_{24}=\frac{M}{R^2}; \quad R_{24}=\frac{R^2}{r_M}; \quad C_{25}=\frac{L_{22}-M}{R^2}; \quad R_{25}=\frac{R^2}{r_{22}} \quad (6)$$

The reciprocal network obviously comprises only positive resistances and capacitances, and is thus physically realizable. When the transformer winding 610 is loaded with the impedance $Z_b$, an equivalent impedance $m^2.Z_b$ is obtained over the winding 620, as shown in the preceding. This transformed impedance lies in series with $L_{22}-M$ and $r_{22}$ and corresponds to proportional changes in the partial impedances $C_{25}$ and $R_{25}$ of the reciprocal network, whereas the other partial impedances are not affected by $Z_b$. This has a fundamental importance for the use of the between-transformer 62—61 in Fig. 4 since it proves, that after the reciprocal impedances $C_{23}$, $R_{23}$, $C_{24}$, $R_{24}$, $C_{25}$ and $R_{25}$, concerning only the transformer itself, have once for all been set for a certain transformer, said transformer is eliminated from the measuring device as regards the impedance over the terminals of winding 610, with the exception that the transformer only entails a number factor $m$. By choosing $m$ as a ten power factor, suitably 10, 100 or 1000, simple relations are obtained between the object $Z_b$ to be measured and the corresponding changes in $C_{25}$ and respectively $R_{25}$.

A mechanical embodiment of the transformer 61—62 intended for measuring an impedance $Z_b$ shaped as a magnetically closed, windingless iron core, is shown in Fig. 8. Said transformer may be said to have an equivalent diagram similar to the diagram in Fig. 6.

The device according to Fig. 8 has three legs 73, 74 and 75 mounted on a common bottom 72, which in its turn is fixed to a plate 71. Over the three legs there lies a metallic top piece 82, which over three contacts 81 forms an electrically conducting bridge over the legs 73, 74 and 75. Said top piece is turnably mounted round an axis 80 fastened to a holder 79. Said last mentioned details are, with the exception of the plate 71 and the holder 79, made of a metal with high conductibility. On the leg 74 are threaded a toroidal coil consisting of a core 78 with winding 77, and a non-metallic disc 84 serving as bedding for the core 76 to be measured. The device according to Fig. 8 may thus be said to consist of a transformer with a winding 77 with many turns, an iron core 78 and a winding 74—81—82—73—75—72 with a single turn. The winding 77 is connected in series with the resistance 3 in one of the branches of the impedance-reciprocal two-pole network according to Fig. 4. The appearance of the impedance 2 is as shown in Fig. 7.

Before the object to be measured, i. e. the core 76, is threaded on the leg 74, the shunt-inductance, leak inductance and loss resistances of the transformer must first be balanced in the impedance 2, which takes place in the following manner: The top piece 82 is lifted. The condensers $C_{23}$ and $C_{25}$ and the resistance $R_{24}$ are disconnected, and the resistance $R_{25}$ is short-circuited. The balancing is thereafter effected only with the condenser $C_{24}$ and the resistance $R_{23}$. Thereafter, the top piece 82 is pushed down into contact with the legs 73, 74 and 75. The condensers $C_{23}$ and $C_{25}$ and the resistances $R_{24}$ and $R_{25}$ are connected in, whereafter the balancing is effected only with the condenser $C_{25}$ and the resistance $R_{25}$. The top piece 82 is then lifted and a toroidal core is threaded as calibration core on the leg 74, said core having negligibly small losses at the frequency used in the measuring circuit. The top piece 82 is again pushed down into contact with the legs 73, 74 and 75 and the balancing is again effected with the condenser $C_{25}$ and the resistance $R_{25}$. If it thereby appears that the resistance $R_{25}$ must be changed in order to give full balance in the measuring circuit 4, this indicates that the resistance $R_{23}$ or $R_{25}$ has a wrong value, due to what the whole balancing process must be effected once more, but for another initial value of the resistances $R_{23}$ or $R_{25}$. An analogous after-adjustment-process takes place for $C_{23}$ and $R_{24}$. When the initial settings are correct, the object 76 to be measured is finally threaded on the leg 74 and the final balancing is effected with $C_{25}$ and $R_{25}$. The inductance and loss factor of the object to be measured is then obtained from the relations:

$$L_{76}=\frac{\Delta C_{25}.R^2}{m^2}; \quad d=\frac{1}{\omega.\Delta C_{25}.\Delta R_{25}} \quad (7)$$

where $L_{76}$ is the inductance of the object to be measured, said inductance having only one turn, $\Delta C_{25}$ is the change of capacitance of the condenser $C_{25}$ at final balancing $m$ is the winding turns conversion of the transformer 61—62, $d$ is the loss factor of the object to be measured, $\omega$ is the frequency of the used measuring voltage, $\Delta R_{25}$ is the change of resistance of the resistance $R_{25}$ at final balancing.

In order quicker to achieve the right initial setting before the object to be measured is placed on the leg 74, it is suitable to measure also each one of the two loss-free ring cores as an object, thereafter measuring them both at the same time. In this case the summed up partial results of resistance and inductance must also exactly agree with the measured result when the two ring cores are measured together. It has appeared at tests that there are no difficulties in obtaining the exact initial setting of the impedances in the network according to Fig. 6. It lies in the nature of things that the resistances 3 comprised in the two-pole network must be very accurately equal to one another. If thus the resistance in Fig. 3, which lies in series with the impedance 1, has a higher resistance than the exact value R, this means that the loss resistance of the impedance 1 must be artificially increased with a value corresponding to the partial resistance surpassing R. The fault is most noticeable when the impedance 1 has a low loss resistance, which is usually the case when the impedance 1 has a low inductance.

For practical reasons it may be suitable to arrange each one of the condensers $C_{25}$ and resistances $R_{25}$ as double, parallel-connected decades as regards the capacity and respectively the conductibility. One of the $C_{25}R_{25}$ pair is used only when setting the correct initial value, and the other $C_{25}R_{25}$ pair is not connected until the object to be measured is connected, said second mentioned pair being used at final balancing, the last mentioned $C_{25}R_{25}$ pair thus corresponding to $\Delta C_{25}$ and $\Delta R_{25}$ in the relations (7).

The device according to Fig. 8 is not limited for use when ring cores are the objects to be measured, but the shown embodiment may be used for all ring types with a single central hole.

For iron cores having more than one central hole, the legs 73, 74 and 75 are modified so that their essential characteristic, to be an integral part of the one secondary measuring winding turn surrounding the object to be measured, is maintained.

In case the transformer 61—62 has a core with low but not necessarily negligible losses, it is suitable to combine the adjustable impedance 2 as is shown in Fig. 9. It comprises a parallel connection of two partial networks of impedances, the first of which consists of a connection in series of the condenser $C_{24}$ and a condenser $C'_{25}$ and the second one consists of a connection in series of the resistance $R_{24}$ and a resistance $R'_{25}$, which latter is connected in parallel on one hand with the condenser $C''_{25}$ and on the other hand with a resistance $R''_{25}$.

In a manner analogous to what has been described in the preceding $C_{24}$ and $R_{24}$ are first balanced, the other impedances being short-circuited and the top piece 82 lifted. $C'_{25}$ and $R'_{25}$ are thereafter balanced, $C''_{25}$ and $R''_{25}$ being disconnected and the top piece 82 pushed down into contact with the legs 73, 74 and 75. The measurement itself is then effected with $C''_{25}$ and $R''_{25}$, whereafter the following relations are obtained in analogy with the magnitudes defined in the preceding:

$$L_{76} = \frac{C''_{25} \cdot R^2}{m^2}; \quad d = \frac{1}{\omega \cdot C''_{25} \cdot R''_{25}} \qquad (8)$$

In Fig. 10, 1—2—3 is an impedance-reciprocal two-pole network consisting of two branches connected in parallel, one of said branches scomprising a resistance 3 and the impedance 1, which is to be balanced or measured, and the other branch comprising a resistance having the same magnitude as the first mentioned resistance and an adjustable impedance 2, the phase angle of which has a sign which is the opposite of the sign of the phase angle of the impedance 1. A source of potential 46 feeds over a resistance 48 the two-pole network, the poles of which are connected to an oscillograph 47 or another suitable visual indicating instrument. The voltage fed by the source of voltage 46 may be pulse-shaped, sinusoidal, shaped as a saw-tooth, or have any other shape which is easily recognizable with the oscillograph 47. The oscillograph 47 is supposed to have a purely resistive input impedance. Provided, that it reproduces voltages of different magnitudes but of the same periodicity uniformly—but not necessarily without distortion—and that the two-pole network is well-fitted, the oscillograph shows the same curve-shape when it is connected according to Fig. 10 as when it is connected directly over the output terminals of the source of voltage 46. If thus the phase angle of the two-pole network deviates from O, this appears on the oscillograph as a distortion of the voltage curve relatively the voltage curve of the source of voltage.

The measuring device according to Fig. 11 is principally the same as the device according to Fig. 10. The impedance 1 is supposed to consist of a series connection of an inductance 12, connected in parallel with a condenser 132, and a resistance 11. The adjustable impedance 2 comprises a series connection of a condenser 21 and an inductance 232, said series connection being parallel to a resistance 22. The details 21, 232 and 22 are adjustable. With this device, it is thus possible to measure the magnitude of an inductance having a certain capacitance between the winding turns. After the device has been set in the required manner, the data of the sought impedance are obtained from the relations:

$$L_{12} = C_{21} \cdot R^2; \quad R_{11} = \frac{R^2}{R_{22}}; \quad C_{132} = \frac{L_{232}}{R^2} \qquad (9)$$

where $L_{12}$, $R_{11}$, $C_{132}$, $C_{21}$, $R_{22}$ and $L_{232}$ designate the absolute value of the respective magnitude for the details comprised in Fig. 11 and with the same designations, and R is the magnitude of the resistance 3.

When superimposing direct current on bridges and compensating devices it is often difficult to feed in the direct current itself to the measuring device. These difficulties are avoided when using a measuring device according to Fig. 12. Said measuring device resembles the one shown in Fig. 11 except that, on one hand the impedance to be measured has here been supposed to be free from winding capacitances, due to what the inductance 232 and the condenser 132 have been omitted, and on the other hand the branch 3—11—12 is in series with a resistance 480 fed with direct current from a battery 460, connected in parallel with a condenser 49. A similar condenser 49 with negligible impedance compared with the other impedances of the two-pole network at the frequency or frequencies generated by the source of voltage 46 blocks the branch 3—21—22 from the battery 460.

In the measuring devices now described it is especially advantageous to use a measuring voltage shaped as a triangle or a square, since divergences from such a curve-shape appear very clearly on the oscillograph. It is also possible to use direct voltage which is broken and closed in one or the other manner, as long as the oscillograph allows direct visual observation of the shape of the curve. This can be facilitated by the use of a cathode oscillograph with long-persistance, if the impulses follow each other relatively slowly. When the impulses are quick, it is more advantageous to use a cathode oscillograph with self-starting time-circuit, i. e. the time-circuit-voltage is released by the input voltage itself.

It is also possible to use a source of voltage having a pure sinusoidal voltage, which case is shown in Fig. 13. The oscillograph is here equipped with two pairs of plates, one of which is connected to the poles of the two-pole network, and the other directly to the output terminals of the source of potential 46. When the device is set in the required manner, the voltage over the two-pole network lies in phase with the voltage of the source of voltage 46, owing to what the Lissajou-figure visible on the oscillograph is the same, as when the two-pole network is replaced by a resistive resistance. Alternatively, a double beam oscillograph may be used. The beams are connected in the same manner as the single-beam oscillograph, but a time-proportional beam-deflection should be used, so that both processes are simultaneously reproduced on the screen. A coincidence between the pertaining points on the curves, for example at the tops or the zero-points, indicates when the reciprocity conditions are met with.

I claim:

1. In a device for measuring the magnitude of an impedance means, a two-pole network comprising two impedance-reciprocal branches connected in parallel, one of said branches including resistance means and the impedance means to be measured and the other including a resistance means of the same resistance value as the aforesaid resistance means and a variable impedance means having a phase angle the sign of which is opposite to the sign of the phase angle of the impedance means to be measured; and a sensitive measuring circuit means responsive to a variance in the absolute value of the impedance of the two-pole network from the impedance value of each of said equal resistance means.

2. A device according to claim 1, wherein the said variable impedance means comprise at least one variable resistive and at least one variable reactive component, the said components being independently adjustable.

3. A device according to claim 1 for measuring the inductance of a coil in which the resistive value of the coil impedance is less than one-tenth to one-hundredth of the reactive value, and wherein the said variable impedance means comprises a capacitance means and a resistance means connected in series.

4. A device according to claim 3, wherein a variable resistance means is connected in parallel with said capacitance means and said resistance means connected in series.

5. A device according to claim 1 for measuring the inductance of a coil in which the resistive value of the coil impedance is greater than one-tenth to one-hundredth of the reactive value of the coil impedance, and wherein the said variable impedance means comprises an impedance means and a resistance means connected in parallel.

6. A device according to claim 5, wherein a variable resistance means is connected in series with said impedance means and said resistance means connected in parallel.

7. A device according to claim 1, wherein the said measuring circuit means comprises a differential transformer means having a split secondary connected with its outer terminals to the poles of said two-pole network, a comparative resistance means included in the connection between one of said outer terminals and one of said poles, the said resistance means, as converted by the action of said transformer means, having a value equal to each of the resistance means included in said network, and indicating means connected between the inner terminal of said secondary and a connection point between the respective terminal of the comparative resistance means and one of the poles of the network.

8. A device according to claim 7, wherein the said inner terminal is at the midpoint of said secondary, the resistance value of said comparative resistance means being equal to the resistance value of each of the resistance means in the network.

9. A device according to claim 1, wherein the said impedance means to be measured is coupled with the network through a transformer means.

10. A device according to claim 9, wherein the said variable impedance means comprises four partial impedance networks all connected in parallel one with another, the first one of said partial networks including capacitance means, the second a resistance means, the third two resistance means connected in series and the fourth two capacitance means connected in series, the midpoints of said third and fourth partial networks being interconnected for connecting each capacitance means of the respective one of said partial networks in parallel with the resistance means of the other respective partial network.

11. A device according to claim 10, wherein the said two interconnected capacitance means and resistance means of the third and fourth partial networks constitute double, parallel connected decades in regard to capacitance and conductivity.

12. A device according to claim 1, wherein the said impedance means to be measured are coupled with the network through a transformer means, and wherein the said variable impedance means comprise two partial impedance network means connected in parallel one with the other, one of said partial networks including two capacitance means connected in series and the other including two resistance means also connected in series, the midpoints of said two partial networks being interconnected for connecting in parallel each capacitance means of the respective partial network with the respective resistance means of the other partial network, one of the resistance means of the respective partial network being further connected in parallel with an additional resistance means and an additional capacitance means.

13. A device according to claim 1, wherein the said measuring circuit means comprise oscillograph means connected in parallel with said two-pole network, and wherein a source of alternating voltage is also connected in parallel with said two-pole network.

14. A device according to claim 13, wherein the said oscillograph means include two pairs of electrode plates, on of said plates being connected in parallel with said two-pole network and the other being connected with the terminals with said source of voltage, and wherein a resistance means is included in the connection of said other plate with one of the terminals of the source of voltage.

15. A device according to claim 13 for measuring the magnitude of an inductance and further comprising a source of direct voltage connected to the branch of the two-pole network including the inductance to be measured and a capacitance means having a negligible impedance in comparison with the other impedances included in the two-pole network at the frequencies generated by said source of alternating voltage connected with the other branch of the two-pole network so as to block the said latter branch from said source of direct voltage.

References Cited in the file of this patent

UNITED STATES PATENTS

| | | |
|---|---|---|
| 2,093,103 | Taborsky | Sept. 14, 1937 |
| 2,616,948 | Cannon | Nov. 4, 1952 |